United States Patent
Yamauchi et al.

(12) 
(10) Patent No.: US 6,500,384 B1
(45) Date of Patent: Dec. 31, 2002

(54) PROCESS FOR THE HARDENING TREATMENT OF SINTERED MEMBERS

(75) Inventors: Toshio Yamauchi, Hamamatsu (JP); Kunihiko Murata, Hamamatsu (JP); Susumu Nakano, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 09/666,435

(22) Filed: Sep. 21, 2000

(30) Foreign Application Priority Data

Sep. 28, 1999 (JP) .......................................... 11-273619

(51) Int. Cl.7 ................................................. B22F 3/24
(52) U.S. Cl. ............................................ 419/29; 419/26
(58) Field of Search ................................. 419/6, 29, 26

(56) References Cited

U.S. PATENT DOCUMENTS

| | | | | |
|---|---|---|---|---|
| 3,795,404 A | * | 3/1974 | Ogawa et al. ........... | 277/235 R |
| 4,280,841 A | * | 7/1981 | Ito et al. ........................ | 75/203 |
| 4,430,386 A | * | 2/1984 | Watanabe et al. ........... | 428/555 |
| 6,200,524 B1 | * | 3/2001 | Griskin et al. .................. | 419/8 |

* cited by examiner

Primary Examiner—Daniel J. Jenkins
(74) Attorney, Agent, or Firm—Alston & Bird LLP

(57) ABSTRACT

The present invention provides a process for the hardening treatment of sintered members which can impart sufficient wear resistance thereto at low cost without causing a reduction in dimensional accuracy due to heat distortion. This process for the hardening treatment of sintered members comprises the steps of coating an iron-based sinterable member with a Ni—P alloy powder containing 7 to 13% by weight of phosphorus so as to give a coating weight of 0.1 to 1.2 mg/mm$^2$; sintering the iron-based sinterable member coated with the Ni—P alloy powder at a temperature in the range of 1,000 to 1,300° C.; and hardening the iron-based sintered member by cooling it at a cooling rate of not less than 10° C./min. until a temperature of 200° C. is reached.

6 Claims, 2 Drawing Sheets

25μm

Ni-P ALLOY POWDER

SINTERED MEMBER

200μm

PROCESS FOR THE HARDENING TREATMENT OF SINTERED MEMBERS

BACKGROUND OF THE INVENTION

1. Field of the Invention

This invention relates to a process for the hardening treatment of sintered members which can harden all or part of an iron-based sintered member without producing any heat distortion, and can thereby improve its wear resistance.

2. Description of the Related Art

Conventionally, synchronizing hubs which are iron-based sintered parts are frequently used in the transmissions of four-wheeled motor vehicles. Since these synchronizing hubs come into face contact with counter parts, they are required to have high wear resistance. In the case of such parts requiring wear resistance, it has been conventional practice to subject sintered parts to a thermal refining treatment comprising quenching and tempering, induction hardening, impregnation treatment (also known as an infiltration treatment) or the like and thereby improve the hardness and wear resistance thereof.

However, the above-described conventional hardening processes have the following problems.

1) Since the thermal refining treatment is carried out by heating a whole sintered member and cooling it rapidly, the sintered member may undergo a heat distortion. Consequently, it has been difficult to obtain high dimensional accuracy stably.

2) Induction hardening has the advantage that the sintered member retains high dimensional accuracy. However, the induction hardening equipment is expensive. Moreover, separate hardening coils are required for different types of sintered members, so that treating costs may be increased because of limited flexibility. Thus, induction hardening has the disadvantage that the overall cost is high.

3) The impregnation treatment is a method in which another infiltration metal is melted and infiltrated into a sintered member to fill the pores of the sintered member and thereby improve the strength and toughness thereof. To this end, powdered copper is usually used as the infiltration metal. However, it has been impossible to achieve sufficient wear resistance.

4) Another process is to harden a sintered member by modifying the composition of a sinterable powder mixture or allying it. However, since this process involves tempering or cementation hardening, a heat distortion may be produced. Consequently, it has been difficult to obtain high dimensional accuracy stably.

SUMMARY OF THE INVENTION

An object of the present invention is to solve the above-described problems by providing a process for the hardening treatment of sintered members which can impart sufficient wear resistance thereto at low cost without causing a reduction in dimensional accuracy due to heat distortion.

In order to accomplish the above object, the present invention provides a process for the hardening treatment of sintered members which comprises the steps of compacting an iron-based sinterable powder mixture to form a compact; coating the compact with a coating material comprising a Ni—P alloy powder containing 7 to 13% by weight of phosphorus so as to give a coating weight of at least 0.1 mg/mm$^2$; sintering the compact coated with the Ni—P alloy powder to produce an iron-based sintered member; and hardening the iron-based sintered member by cooling it.

In the above-described hardening treatment process, the coating material applied to the compact comprises a powder, so that the coating material can be easily applied and used for purposes of local treatment. Moreover, since the aforesaid coating material comprises a Ni alloy, the heat of sintering causes the coating material to penetrate into the compact and diffuse into its iron matrix to form a solid solution, and the subsequent cooling step can transform the iron matrix into a martensitic structure and thereby form a hardened layer. This martensitic structure is a very hard metallographic structure and can hence improve the wear resistance of the sintered member. Moreover, since the coating material contains 7 to 13% by weight of P, this P penetrates and diffuses deeper into the compact, so that a hard steadite structure (Fe$_3$P) is precipitated to form a hardened layer and thereby improve the wear resistance of the sintered member. The thickness of the hardened layer can be controlled by varying the coating weight of the coating material.

In the process for the hardening treatment of sintered members in accordance with another embodiment of the present invention, the aforesaid coating material is applied so as to give a coating weight of 0.1 to 1.2 mg/mm$^2$, the aforesaid sintering is carried out at a temperature in the range of 1,000 to 1,300° C., and the aforesaid cooling is carried out at a cooling rate of not less than 10° C./min. until a temperature of 200° C. is reached.

Since the aforesaid sintering temperature is in the range of 1,000 to 1,300° C., the compact can be treated in a conventional sintering furnace without requiring special equipment or high costs.

The process for the hardening treatment of sintered members in accordance with the present invention can impart high wear resistance thereto at low cost without producing any heat distortion.

DETAILED DESCRIPTION OF PREFERRED EMBODIMENTS

Figure 1:
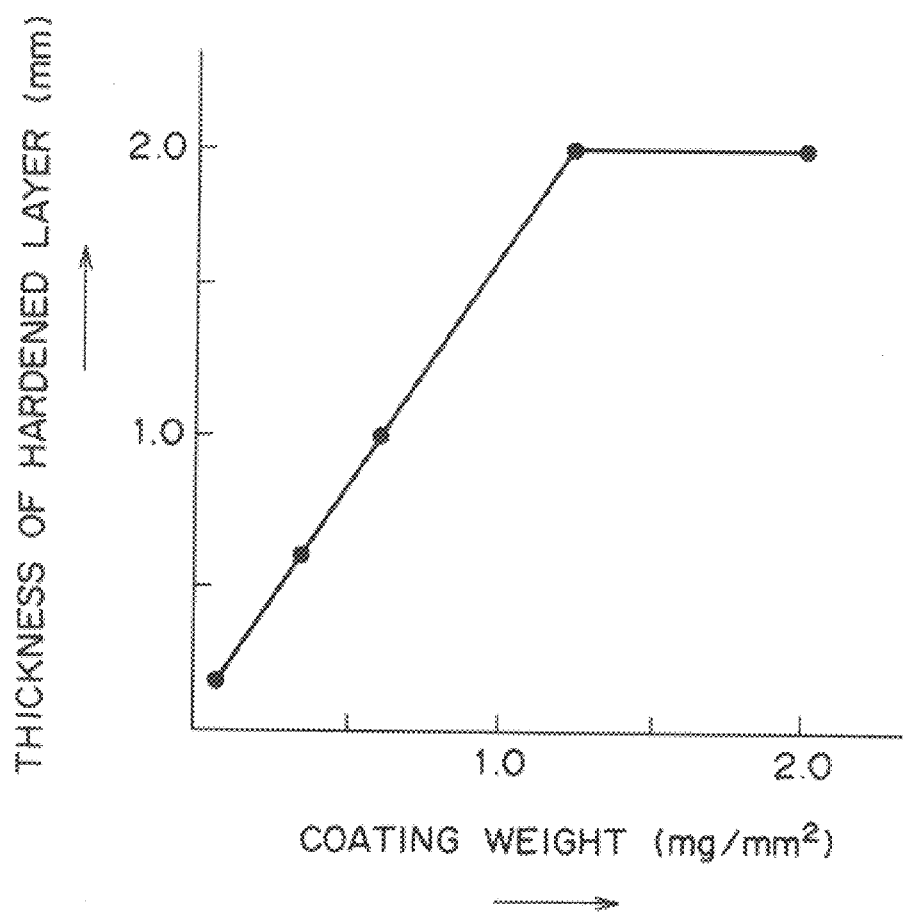
FIG. 1 is a graph showing the relationship between the coating weight of the alloy powder applied to a compact and the thickness of the hardened layer formed therein.

Several embodiments of the present invention are specifically described hereinbelow.

The process for the hardening treatment of sintered members in accordance with the present invention comprises the steps of compacting a sinterable powder mixture by means of a press or the like to form a compact; coating the compact with a Ni—P alloy powder, sintering the compact coated with the Ni—P alloy powder in a sintering furnace; and hardening the resulting sintered member by cooling it in the same or different sintering furnace.

The characteristic features of the hardening treatment process of the present invention are as follows.

1) In the conventional thermal refining treatment and the like, sintered members are heated after sintering. This heating may produce a heat distortion in the sintered members. However, the present invention involves no risk of heat distortion because sintered members are not heated after sintering.

2) The hardening treatment is carried out in a sintering furnace. Except for the sintering furnace, no special equipment is required.

3) While the conventional impregnation treatment with powdered copper failed to impact a sufficient hardness to sintered members, the present invention makes it possible to form a hardened layer having a sufficient hardness in sintered members by utilizing the heat of sintering.

4) The composition of the sinterable powder mixture used in the present invention may be the same as that of any conventionally used one. A compact formed therefrom is coated with a coating alloy powder which can form a hardened layer.

5) In a sintered member to be treated, only a part thereof requiring wear resistance may be coated with the coating alloy powder. If desired, however, a hardened layer may be formed over the whole sintered member.

[Sinterable Powder Mixture]

As the aforesaid sinterable powder mixture, there may be used any of conventionally used powder mixtures, such as common iron-based materials as prescribed by JIS Z 2550. For example, Fe—Cu, Fe—C, Fe—C—Cu, Fe—C—Cu—Ni, Fe—Ni and Fe—C—Ni powder mixtures may be used. Moreover, both metal powder mixtures and metal alloy powders may be used.

[Compact]

A compact is made by charging a metal mold with the aforesaid sinterable powder mixture and applying pressure thereto by means of a press. This compact must have a strength sufficient to withstand manual handling and an operation for applying an alloy powder thereto as will be described later.

[Coating Material]

As the coating material applied to the compact, a Ni—P alloy powder composed of nickel (Ni) and phosphorus (P) is used as such or in the form of a paste prepared by mixing the powder with an organic medium.

The content of P is preferably in the range of 7 to 13% by weight and more preferably 10 to 12% by weight. Alternatively, there may also be used pellets formed by compacting a Ni—P alloy powder, or a molten material prepared by melting a Ni—P alloy. In the compact, only a part thereof requiring wear resistance may be coated with the coating material. If desired, however, the whole compact may be coated with the coating material, or the whole compact may be dipped into a paste comprising a Ni—P alloy powder.

Now, the reason why Ni and P are used as constituents of the coating material is described below.

Ni diffuses into the iron matrix of the compact to form a solid solution. Thus, the iron matrix is transformed into a hard martensitic structure as a result of cooling. While the sintering temperature is in the range of 1,000 to 1,300° C., the melting point of Ni is as high as 1,455° C. Accordingly, in order to harden the sintered compact to some desired depth, it is necessary to lower the melting point of the coating material so that the coating material may melt and penetrate into the compact. For this reason, there is used a Ni—P allow powder containing P as an element which serves to lower the melting point and form a compound.

The aforesaid range of the content of P has been defined on the basis of the melting point of the coating material. Specifically, as the content of P is increased from 7% by weight, the melting point of the coating material lowers to 1,000° C. or below and reaches 880° C. at 11% by weight. However, as the content of P is increased from 11% by weight, the melting point of the coating material rises on the contrary, and reaches 1,000° C. at 13% by weight. If the content of P is greater than 13% by weight, the melting point of the coating material exceeds 1,000° C. Accordingly, the content of P has been restricted within the range of 7 to 13% by weight so that the melting point will not exceed 1,000° C. for common sintering temperatures of 1,000 to 1,300° C.

[Coating Weight of Coating Material]

The coating weight of the aforesaid coating material is not less than 0.1 mg/mm$^2$ and preferably in the range of 0.1 to 1.2 mg/mm$^2$. If the coating weight is less than 0.1 mg/mm$^2$, the resulting sintered member has the disadvantage that the hardened layer is thin or nonuniform.

More preferably, the coating weight is in the range of 0.3 to 1.2 mg/mm$^2$. The reason why the upper limit has been set is that, if the coating weight is greater than 1.2 mg/mm$^2$, the thickness of the hardened layer does not increase any more, and no additional effect is obtained in spite of an increased cost. Within this range, the most preferred coating weight is 0.6 mg/mm$^2$.

[Sintering Temperature]

The sintering temperature is preferably in the range of 1,000 to 1,300° C. and more preferably 1,100 to 1,200° C. The sintering temperature may be almost equal to that employed for common sintered members and, in other words, may be within a temperature range which can be accommodated by conventional sintering furnaces. Thus, the sintering temperature need not be raised or lowered as compared with the prior art. Moreover, since no gas is evolved from the Ni—P alloy powder, there may be used the same sintering furnace as used for common sintered members.

When the sintering temperature reaches 1,000° C. or above, the Ni—P alloy containing 7 to 13% by weight of Ni melts and diffuses into the Fe matrix of the compact. However, if the sintering temperature is lower than 1,000° C., the diffusion of the sintering alloy powder is retarded or inhibited and, therefore, it becomes difficult to impart sufficient strength to the sintered member itself. Moreover, the Ni—P alloy containing 7 to 13% by weight of Ni does not melt or diffuse easily.

[Cooling]

The Fe matrix of the compact, into which Ni from the coating agent has diffused to form a solid solution, is transformed into a martensitic structure as a result of primary cooling and hence exhibits good wear resistance.

P penetrates and diffuses deeper into the compact, in which P is precipitated and distributed in the form of steadite ($Fe_3P$). This steadite is also a hard structure which is effective for the improvement of wear resistance.

The cooling rate need not be particularly high. However, if the cooling rate is unduly low, the iron matrix into which Ni has diffused is not transformed into a martensitic structure, but pearlite and bainite are precipitated therein.

Accordingly, the cooling must be carried out at a cooling rate of not less than 10° C./min. until a temperature of 200° C. is reached. For a sintering temperature of 1,000° C., it is preferable to employ a cooling rate of not less than 10° C./min. until a temperature of 300° C. is reached, and for a sintering temperature of 1,300° C., it is preferable to employ a cooling rate of not less than 15° C./min.

The present invention is more specifically explained with reference to the following example.

EXAMPLE 1

As the iron-based sinterable powder mixture, there was used a sinterable powder mixture composed of 97.3% by weight of Fe, 0.7% by weight of C, 1% by weight of Cu, and 1% by weight of Ni, and corresponding to JIS SMF5030 prescribed by JIS Z 2550. Compacts were made by compacting this sinterable powder mixture so as to give a sintered density of 6.9 g/cm$^3$.

As the coating material, there was used a Ni—P alloy powder comprising Ni to which 11% by weight of P had been added, and having a particle size of not greater than 100 mesh. This alloy powder was formed into a paste by using PVA (polyvinyl alcohol) as an organic binder. The ratio of the Ni—P alloy powder to PVA was 5:1.

In order to examine the effect of the coating weight of the alloy powder on the hardened layer, the alloy powder was applied to the compacts in a coating weight of 0.1, 0.3, 0.6, 1.2 or 2.0 mg/mm$^2$. Using a furnace, these compacts were heated to a sintering temperature of 1,150° C. over a period of 30 minutes, held at that temperature for 20 minutes, cooled to 300° C. in the furnace at a cooling rate of 30° C./min., and thereafter allowed to cool in air. This furnace had a non-oxidizing atmosphere. The results showing the relationship between the coating weight of the coating material and the thickness of the hardened layer are shown in Table 1 and FIG. 1.

TABLE 1

| Specimen No. | Coating weight of coating material (mg/mm$^2$) | Thickness of hardened layer (mm) |
| --- | --- | --- |
| 1 | 0.1 | 0.2 |
| 2 | 0.3 | 0.6 |
| 3 | 0.6 | 1.0 |
| 4 | 1.2 | 2.0 |
| 5 | 2.0 | 2.0 |

By reference to the graph of FIG. 1, it has been found that, when the coating weight of the alloy powder is within a range up to 1.2 mg/mm$^2$, there is a linear relationship between the coating weight and the thickness of the hardened layer, and the thickness of the hardened layer can hence be controlled by varying the coating weight of the alloy powder. For commercial purposes, the thickness of the hardened layer needs to be at least about 0.2 mm, and a thickness of 1 mm will usually suffice.

Figure 2:
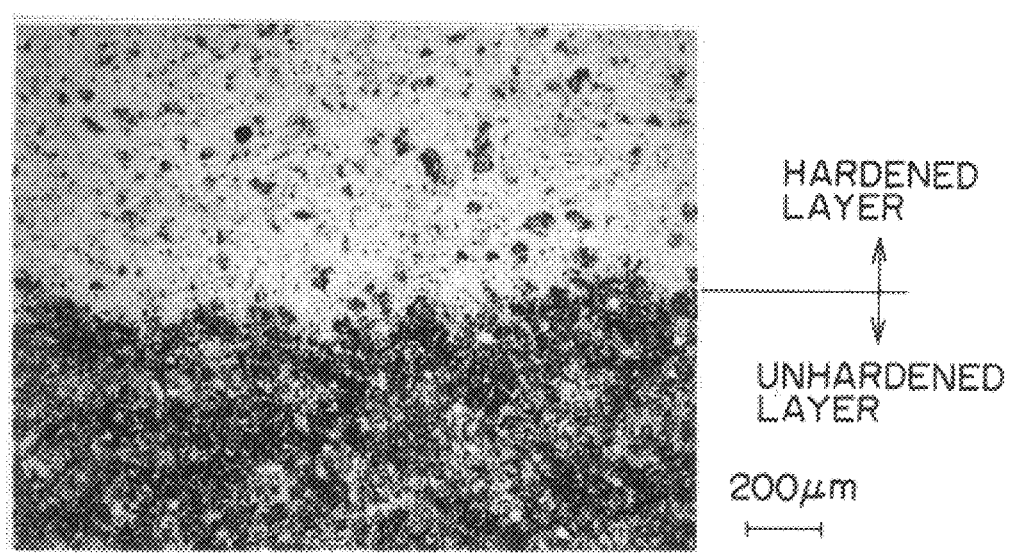
FIG. 2 is a metallographic photomicrograph (at a magnification of 50 diameters) of a sintered member made in Example 1, showing a region around a hardened layer comprising a martensitic structure and steadite formed in the sintered member.
Figure 3:
FIG. 3 is a metallographic photomicrograph (at a magnification of 400 diameters) of a sintered member made in Example 1, showing a martensitic structure formed in a part of the sintered member.

FIGS. 2 and 3 show photomicrographs of sintered members made in Example 1. Specifically, FIG. 2 shows a region around the interface between a hardened layer comprising a martensitic structure and steadite, and an unhardened layer, and FIG. 3 shows a martensitic structure formed in a part of a sintered member.

In FIG. 2, the hardness (Hv) of the hardened layer is of the order of 300 to 400, and this hardness does not depend on the thickness of the hardened layer. Thus, it has been found that the hardness of the hardened layer is increased as compared with the unhardened layer having a hardness (Hv) of 100 to 200.

COMPARATIVE EXAMPLE 1

A compact formed from a Fe-based sinterable powder mixture having the same composition as described in Example 1 was coated with a coating material comprising a Ni—P alloy powder. This Ni—P alloy had the same composition as that used in the foregoing Example 1. Then, this compact was heated to a sintering temperature of 950° C. over a period of 30 minutes, held at that temperature for 20 minutes, cooled to 300° C. in the furnace at a cooling rate of 20° C./min., and thereafter allowed to cool in air.

Figure 4:
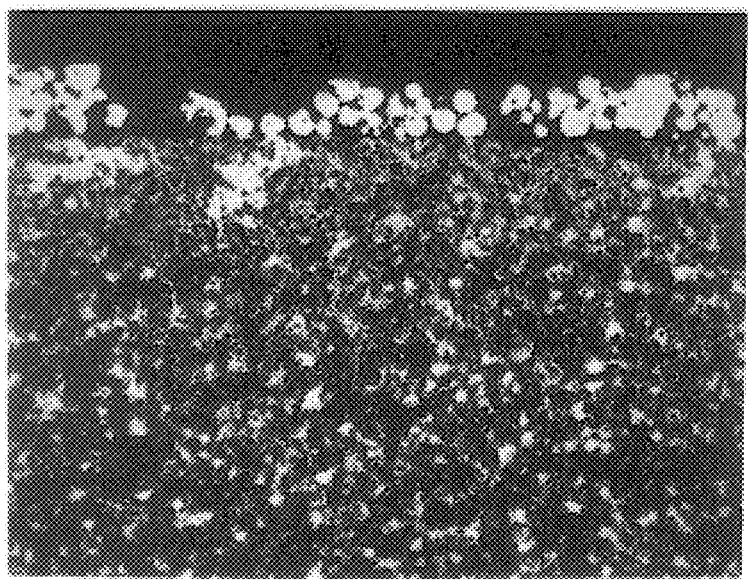
FIG. 4 is a metallographic photomicrograph (at a magnification of 50 diameters) of the surface region of the sintered member made in Comparative Example 1.

Consequently, the Ni alloy powder containing 11% by weight of P did not melt and diffuse sufficiently, so that no hardened layer was obtained as shown in FIG. 4. However, the sinterable powder mixture was sintered.

This Comparative Example 1 indicates that the treatment of the present invention cannot be achieved under the conditions which include heating a compact to a sintering temperature of 950° C. over a period of 30 minutes and holding it at that temperature for 20 minutes. However, if the heating time and the holding time are prolonged, a hardened layer can be obtained even at a sintering temperature of 950° C.

COMPARATIVE EXAMPLE 2

Iron-based compacts similar to those used in Example 1 were coated with a Ni alloy powder containing 6% by weight of P or a Ni alloy powder containing 14% by weight of P. These compacts were placed in a sintering furnace having a temperature of 1,200° C., held at that temperature for 20 minutes, taken out of the furnace, and allowed to cool. Consequently, the Ni—P alloy powder did not melt substantially but remained on the compact.

It is to be understood that the present invention is not limited to the above-described embodiments, but various modifications and changes may be made according to the technical idea of the present invention. For example, the objects which can be treated according to the present invention are not limited to synchronizer hubs as described previously in connection with the prior art, but the present invention may be applied to various parts requiring wear resistance, such as cam shaft timing pulleys and cam lobes.

What is claimed is:

1. A process for the hardening treatment of sintered members which comprises the steps of compacting an iron-based sinterable powder mixture to form a compact; coating said compact with a Ni—P alloy powder containing 7 to 13% by weight of phosphorus so as to give a coating weight of at least 0.1 mg/mm$^2$; sintering said compact coated with the Ni—P alloy powder to produce an iron-based sintered member; and hardening said iron-based sintered member by cooling it.

2. A process for the hardening treatment of sintered members as claimed in claim 1 wherein the Ni—P alloy powder is applied so as to give a coating weight of 0.1 to 1.2 mg/mm$^2$, said sintering is carried out at a temperature in the range of 1,000 to 1,300° C., and said cooling is carried out at a cooling rate of not less than 10° C./min. until a temperature of 200° C. is reached.

3. A process for the hardening treatment of sintered members as claimed in claim 1 which further comprises the steps of preparing a paste by adding an organic medium to the Ni—P alloy powder containing 7 to 13% by weight of phosphorus, and applying the paste to said compact.

4. A process for the hardening treatment of sintered members as claimed in claim 1 wherein a martensitic structure and a steadite structure are formed on the surface region of the iron-based sintered members by cooling the iron-based sintered members.

5. A process for the hardening treatment of sintered members as claimed in claim 2 wherein a martensitic structure and a steadite structure are formed on the surface region of the iron-based sintered members by cooling the iron-based sintered members.

6. A process for the hardening treatment of sintered members as claimed in claim 3 wherein a martensitic structure and a steadite structure are formed on the surface region of the iron-based sintered members by cooling the iron-based sintered members.

* * * * *